United States Patent
Reisswig (10) Patent No.: US 11,763,094 B2
(45) Date of Patent: Sep. 19, 2023

(54) CASCADE POOLING FOR NATURAL LANGUAGE PROCESSING

(71) Applicant: SAP SE, Walldorf (DE)

(72) Inventor: Christian Reisswig, Berlin (DE)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 17/319,427

(22) Filed: May 13, 2021

(65) Prior Publication Data

US 2022/0366144 A1 Nov. 17, 2022

(51) Int. Cl.
*G06F 40/30* (2020.01)
*G06F 40/126* (2020.01)
*G06V 10/40* (2022.01)
*G06V 10/22* (2022.01)
*G06N 3/08* (2023.01)
*G06V 30/10* (2022.01)

(52) U.S. Cl.
CPC .......... *G06F 40/30* (2020.01); *G06F 40/126* (2020.01); *G06N 3/08* (2013.01); *G06V 10/225* (2022.01); *G06V 10/40* (2022.01); *G06V 30/10* (2022.01)

(58) Field of Classification Search
CPC ...... G06F 40/30; G06F 40/126; G06F 40/117; G06F 40/216; G06F 40/284; G06F 40/131; G06N 3/08; G06V 10/225; G06V 10/40; G06V 30/10
See application file for complete search history.

(56) References Cited

U.S. PATENT DOCUMENTS

| | | | |
|---|---|---|---|
| 10,540,579 B2 | 1/2020 | Reisswig et al. | |
| 2019/0278845 A1* | 9/2019 | Frison | G06F 40/30 |
| 2020/0117961 A1* | 4/2020 | Reisswig | G06N 3/08 |
| 2021/0012102 A1 | 1/2021 | Cristescu et al. | |
| 2021/0049443 A1* | 2/2021 | Klaiman | G06N 3/04 |
| 2021/0125034 A1 | 4/2021 | Nguyen et al. | |
| 2022/0237444 A1* | 7/2022 | Wigington | G06N 3/045 |
| 2022/0318412 A1* | 10/2022 | Guo | G06N 3/047 |

OTHER PUBLICATIONS

"European Application Serial No. 22162862.1, Extended European Search Report dated Sep. 9, 2022", 11 pgs.
Denk, Timo, "Wordgrid; Extending Chargrid with Word-level Information (Thesis)", (Sep. 2, 2019), 68 pgs.
(Continued)

*Primary Examiner* — Bhavesh M Mehta
*Assistant Examiner* — Philip H Lam
(74) *Attorney, Agent, or Firm* — SCHWEGMAN LUNDBERG & WOESSNER, P.A.

(57) ABSTRACT

Natural language processing systems and methods are disclosed herein. In some embodiments, digital document information comprising text is received. The digital document information may be processed through word and character encoding operations to generate word and character vectors while retaining document location information for the words and characters. The data may be then be processed by a series of convolution and maximum pooling operations to obtain maximum valued elements from the data. The document location information as well as the maximum values element data may be further processed for semantic classification of the data using a semantic classifier and bounding box regression.

20 Claims, 8 Drawing Sheets

(56) References Cited

OTHER PUBLICATIONS

Katti, Anoop, "Chargrid: Toward Understanding 2D Documents", arxiv.org Cornell University Library, (2018), 11 pgs.
Khan, Asifullah, "A Survey of the Recent Architectures of Deep Convolutional Neural Networks", Artificial Intelligence Review. arxiv.org, Cornell University Library, (2019), 70 pgs.
Scherer, Dominik, "Evaluation of Pooling Operations in Convolutional Architectures for Object Recognition", ICANN, Part III, LNCS 6354, (2010), 10 pgs.

* cited by examiner

CASCADE POOLING FOR NATURAL LANGUAGE PROCESSING

BACKGROUND

1. Field

Embodiments of the present teachings relate to natural language processing. More specifically, embodiments relate to natural language processing by utilizing cascaded convolution and maximum pooling layers.

2. Related Art

Typical natural language processing (NLP) and computer vision (CV) systems and methods implement neural networks. These neural networks typically comprise arbitrarily stacked layers such as convolution layers, recurrent layers, and self-attention (transformer) layers. The various layers couple input elements in various ways, resulting in various properties. A convolution operation slides a convolution operator across input elements coupling the elements that are closely related on a document. The convolution process provides strong coupling for words and sentences but assumes the characters are ordered in a sequence such as, for example, words and sentences. The convolution operations are translational invariant. The recurrent operation couples all previous elements with the currently analyzed element and therefore, again, assumes a sequenced order to the input elements. The convolution layers and the recurrent layers are translational invariant; therefore, the input elements are coupled based on a relationship between the input elements. The convolution layers and recurrent layers can process arbitrarily long input sequences of varying length; however, the farther in distance two input elements are from one another, the more difficult it is to establish a strong coupling. The difficulty in coupling two distant elements comes from the vanishing gradient problem and because elements may only be coupled by a long chain of computations (e.g., multiple layers).

The self-attention layer couples each input element with each other input element and enforces positional, or location, embedding. The self-attention layer is not translational invariant and non-local as the direct vicinity to a given input element does not typically provide useful information. The self-attention layers can establish a strong coupling between any two input elements regardless of location. The exact ordering, or sequence, of input elements is less relevant. This provides an advantage in the case of non-local contextual information which is often encountered in NLP operations such as machine translation and information extraction. Some drawbacks to self-attention layers are that they are not translational invariant and are therefore limited to a fixed input sequence length, and the computation is quadratic in the number of input elements.

What is needed is one or more neural networks for natural language processing that strongly couples any two elements within a given context window while being translationally invariant and providing linear computation.

SUMMARY

Embodiments described herein provide benefits of introducing layers and building blocks of neural networks that are capable of strongly coupling any two elements within a given context window while maintaining translational invariance and linear computation. A first embodiment is directed to a computerized method of processing a document for natural language semantic meaning using cascaded convolution pooling layers, the computerized method comprising the steps of receiving the document comprising document information in a digital format, wherein the document information comprises text, processing the text to generate input elements for input into one or more neural networks while retaining document location information indicative of locations of elements in the document, processing the document information by the one or more neural networks comprising the steps of performing at least one convolution max pooling operation comprising the steps of performing at least one convolution operation on the input elements to associated values with the input elements, generating a plurality of parallel pooling branches comprising the input elements, a pooling window, and at least one channel for each pooling branch, performing at least one maximum pooling operation on each pooling branch to generate an output of a plurality of maximum valued elements for the pooling window analyzed across all of the input elements, concatenating the plurality of maximum valued elements from each of the plurality of parallel pooling branches to produce a convolution pooling output, and producing a probability distribution for classification of maximum valued elements of the convolution pooling output, generating semantic classifications for the text based on the document location information indicative of locations of the text in the document and the convolution pooling output.

A second embodiment is directed to a natural language processing system comprising a processor, at data store, and one or more non-transitory computer-readable media storing computer-executable instruction that, when executed by the processor, perform a method of processing a document for natural language semantic meaning using cascaded convolution pooling layers, the method comprising the steps of receiving digital document information for processing by one or more neural networks, wherein the digital document information comprises text, generating a character grid from the digital document information, wherein each character of the text is associated with a location on the document such that a layout information of the document is maintained, and generating a reduced character grid by downsampling the digital document information of the character grid to reduce unnecessary data for processing by the one or more neural networks, processing the digital document information by the one or more neural networks comprising the steps of processing the digital document information through a word-level encoding process to generate word vectors of word couplings while retaining document location information indicative of locations of elements in the document, concatenating the word vectors of the word couplings to generate input elements, performing at least one convolution max pooling operation comprising the steps of performing at least one convolution operation on the input elements to associated values with the input elements, generating a plurality of parallel pooling branches comprising the input elements, a pooling window, and at least one channel for each pooling branch, performing at least one maximum pooling operation on each pooling branch to generate an output of a plurality of maximum valued elements for the pooling window analyzed across all of the input elements, concatenating the plurality of maximum valued elements from each of the plurality of parallel pooling branches to produce a convolution pooling output, and producing a probability distribution for classification of the plurality of maximum valued elements of the convolution pooling output, generating bounding boxes indicative of various semantic classes based on the document location information and the convolution pooling output, and generating semantic classifications for the text based on the document location information and the convolution pooling output.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein:

FIGS. 1A-1B depict exemplary one-dimensional and two-dimensional max pooling processes;

The drawing figures do not limit the claimed scope to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the invention(s) herein described. Other embodiments can be utilized, and changes can be made without departing from the claimed scope. The following detailed description is, therefore, not to be taken in a limiting sense. The scope of the claimed invention(s) is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, embodiments of the invention can include a variety of combinations and/or integrations of the embodiments described herein.

Generally, embodiments may be directed to systems, computerized methods, or computer programs for processing documents using a system of neural networks and max pooling operations for NLP. The NLP process may receive written language information on a document and perform optical character recognition (OCR) to create data for processing. OCR may be performed on the document to determine the characters and words in the document.

Further, the data may then be processed again creating a character grid that provides location information for coupling data that is location relevant. The character grid may be applied to the document to determine document type and create correlations between words and characters on the document based on location. When the words and characters are correlated and the non-character portions of the document are removed, the data may then be processed by successive convolution and max pooling operations. The successive convolution and max pooling processes may extract the semantic meaning of the language from the data. Processing the data using the successive convolution and max pooling processes results in strongly coupled elements within a given context window while being translationally invariant and providing linear computation.

Figure 1A:
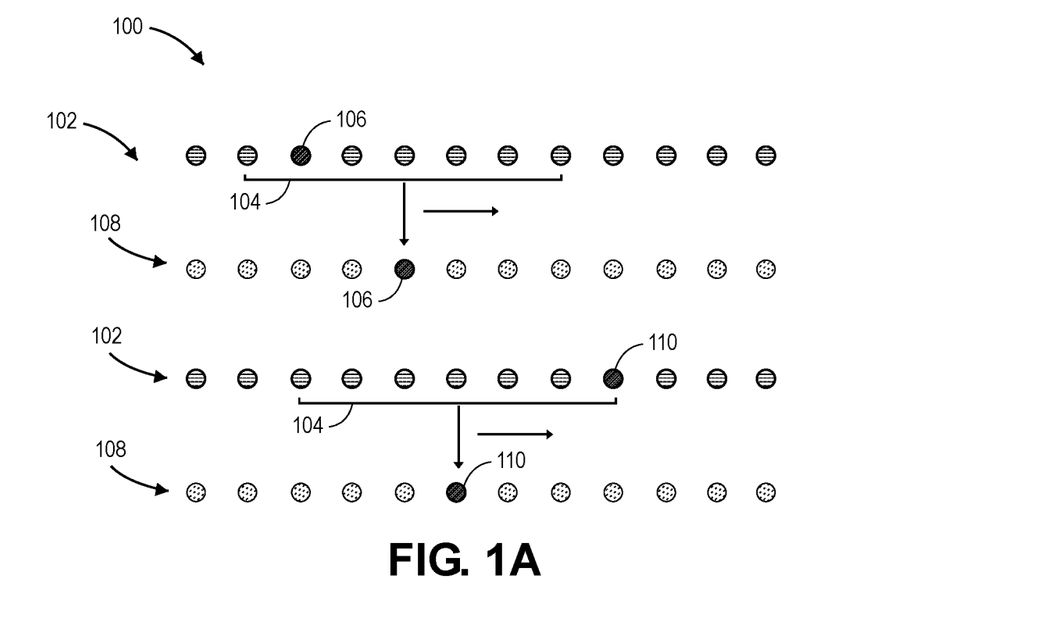

FIG. 1A depicts an example max pooling process generally referenced by numeral 100. In some embodiments, instead of using self-attention (transformer) layers as described above in typical processes, coupling that is non-local and also translational invariant can be achieved by utilizing max pooling. FIG. 1A presents input elements in first sequence 102 and second sequence 108. Window 104 provides subset of input elements for analyzing. The subset of input elements comprises maximum element 106 where the subset of input elements are the input elements contained in window 104. The subset of input elements may be selected for analysis as window 104 slides from left to right in this scenario. In the exemplary embodiment shown in FIG. 1A, window 104 comprises a fixed size of seven elements, and slides along the one-dimensional sequence of input elements using a stride of one, analyzing the subset of input elements. Maximum element 106 denotes the maximum value within the window 104. Maximum element 106 is mapped to second sequence 108. Therefore, second sequence 108 comprises the maximum element contained in window 104 for each input element subset analysis. After maximum element 106 is determined and mapped to second sequence 108, window 104 slides one element to the right and finds second max element 110 as shown in the subsequent process depicted below the first process in FIG. 1A. Consequently, the max pooling operations described herein do not downsample as is typical for a standard max pooling process. Each maximum element is mapped to the output layer such that the dataset is not reduced, and the dimension of data set is maintained.

The process depicted in FIG. 1A presents window 104 analyzing seven input elements resulting in a local analysis creating second sequence 108 that couples each successive seven local elements; however, window 104 may be any size such that any arbitrary number of input elements may be collectively processed. Furthermore, input elements may be, and in practice are, vectors. In some embodiments, each vector is compared to an input vector to determine a single vector that comprises a maximum value or a highest relationship to the compared vector input. The highest relationship, or maximum element 106, is coupled. Each set of vectors may be processed as described above.

Figure 1B:
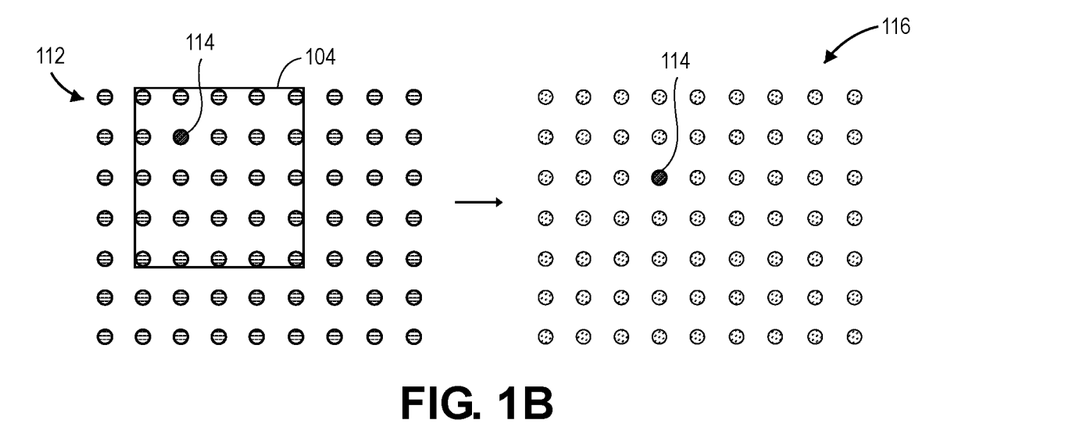

FIG. 1B depicts a two-dimensional max pooling process 112 generally reference by the numeral 116. In two-dimensional max pooling process 112, a two-dimensional subset of input elements comprises rows and columns of input elements that, in some embodiments, may be vectors. The analysis is performed similarly to the one-dimensional process described in relation to FIG. 1A above. In the exemplary process depicted, window 104 comprises five elements to a row and 5 elements to a column resulting in twenty-five elements. After the maximum element 114 from the subset of elements is determined, window 104 may slide over a single row or a single column and analyze the new subset of elements. This process may be performed for all elements as described above and as described above, no downsampling is performed. As such, the data set is not reduced, and the data set dimension is maintained.

Figure 2:
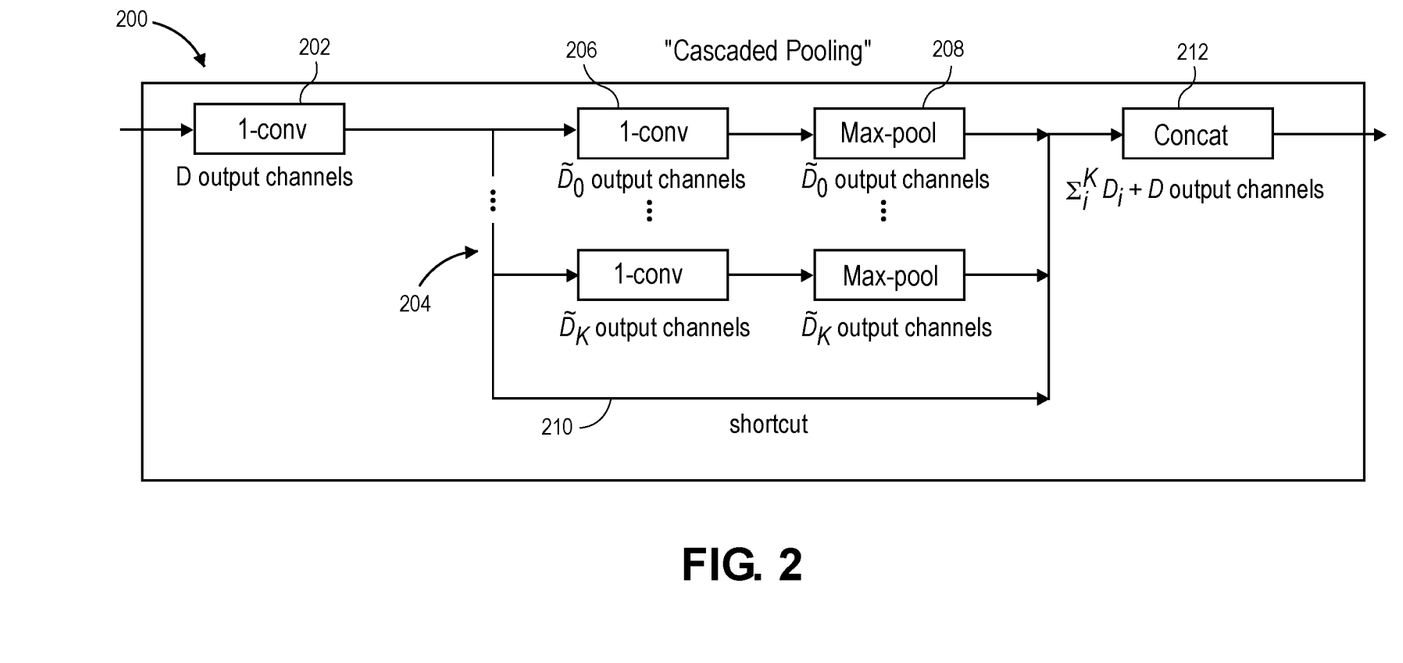
FIG. 2 depicts an exemplary cascaded pooling process.

Turning now to FIG. 2 depicting exemplary cascaded pooling layer 200, in the one-dimensional case, a sequence of N input vectors $x_i$ (i=0, ..., N) of dimension C is first processed by one-convolution (single kernel convolution) 202 with D output channels followed by concatenation by batch normalization and a rectified linear activation function (ReLU) in the case of nonlinearity. The resulting sequence of vectors $\hat{x}_i$ of dimension D is then copied K times forming K branches, or pooling branches 204. Each copy may be subsequently processed by second one-convolution 206 with $\tilde{D}_n$ output channels where n=0 ... K, that is for each of the copies, a one-convolution may be applied resulting in a different number of output channels than input channels. After each convolution, batch normalization may be applied ensuring uniform scale.

Continuing with the one-dimensional example, each of the resulting sequence of vectors $\hat{x}_i''$ of dimension $\tilde{D}_n$ (where n is the n-th branch) is next processed by max pooling operation 208 of window size $2M_n+1$ where the pooling window size may differ for each of the K pooling branches 204. The max pooling operation 208 may be performed with stride one. That is, in contrast to a normal pooling operation which is typically reducing the input dimension, the max-pooling operation window may be shifted by a stride of one over the input thus producing a result for each input element and hence preserving the resolution. At the beginning and end of each sequence, $M_n$ additional vectors may be added to ensure that input and output sequence have the same length. The padded vectors may be set to any value but are typically set to zero. The result of the max pooling operation 208 from each pooling branch is passed through a dropout operator and finally concatenated at block 212 along with the output of one-convolution 206 operation supplied in shortcut 210. The result represents the output of a single 'cascaded pooling' layer. The cascaded pooling layers may be implemented in various network configurations for Named Entity Recognition (NER) for the natural language processing as described below.

Figure 3:
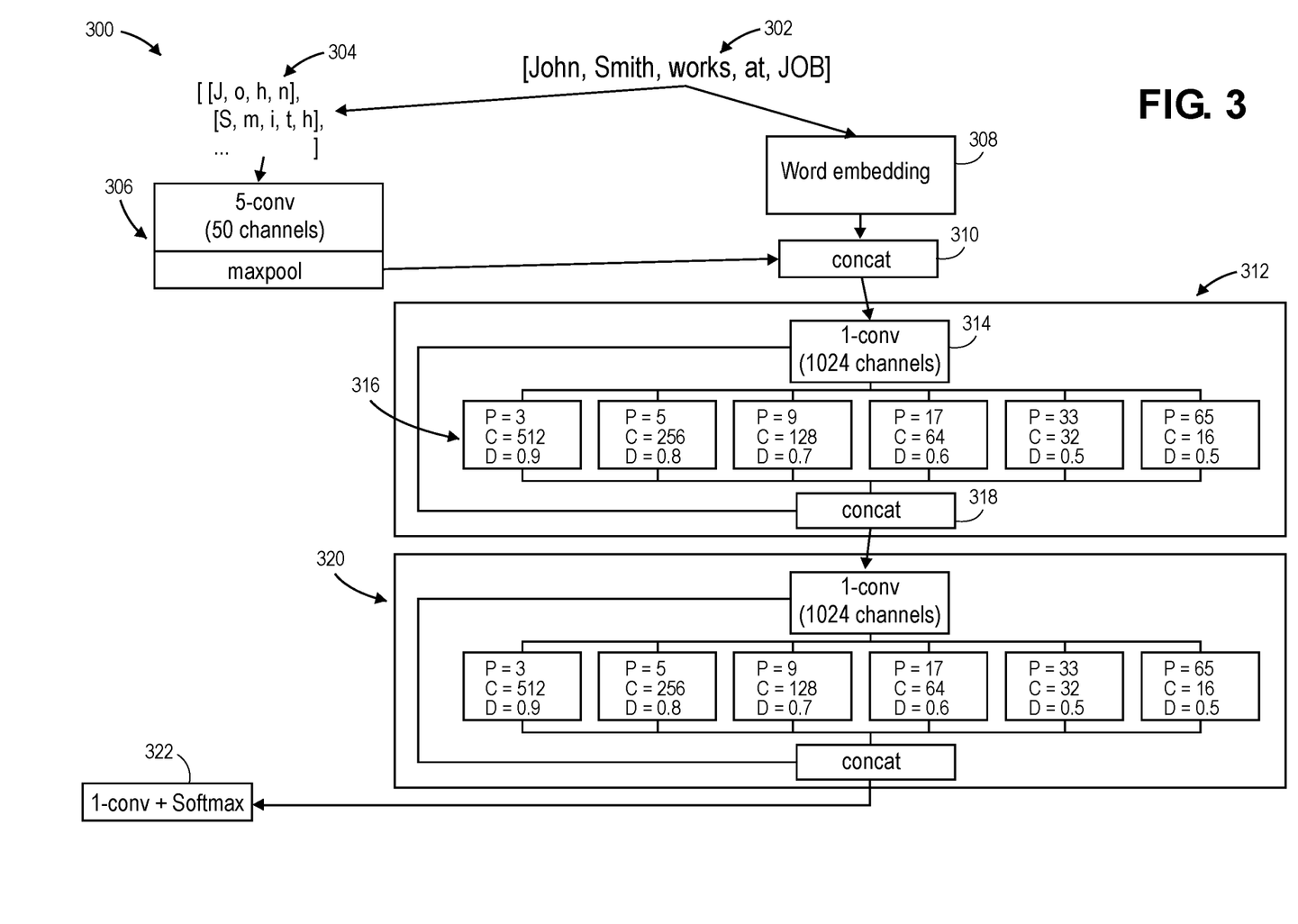
FIG. 3 depicts exemplary cascaded pooling layers.

FIG. 3 depicts an exemplary process of implementing the cascaded pooling method with NER generally referenced by the numeral 300. In some embodiments, the objective of the neural network is to classify each word and determine semantic meaning. In some embodiments, the input elements are strings of text input. For example, a string of text is received, and the neural network may classify each word as a "city," a "person," a vehicle type," or any other classification that may be desirable.

In some embodiments, a sequence from word list 302 may be mapped to a sequence of pretrained word embedding vectors 308. For example, tokens may be added at the beginning and end of each sentence and sentences of similar length may be batched together into buckets. For processing purposes, tokens may be added such that each sentence is the same length. Similarly, an analogous procedure may be followed for the characters in each word generating list of characters 304. Simultaneously, the sequence of word tokens may be transformed for each word to a sequence of characters with a fixed predefined maximum character length of, for example, 10 characters per word at most. The collection of sequences of characters per word may be passed to first convolution pooling operation 306 to capture sub-word embeddings. For each sequence of characters per word, a word-level feature vector is generated and concatenated at block 310.

In some embodiments, first convolution pooling operation 306 which is a convolution-max pool combination receives input data in the form of words with individual characters separated. In some embodiments, the convolution layer provides values to pixels for character recognition and categorization. The convolution and max pooling operations are performed to extract character-level features across 50 channels. In some embodiments, the character-level features may comprise character locations within words and sentences.

Word embedding 308 may be performed on word list 302. Word embedding 308 may be performed to determine how often and where words appears. In some embodiments the word embedding layer may also recognize sub-words or root words and determine the number and location of appearances. The word-level encoding may comprise extracting word-level vectors for word positions in each sentence of the text provided. Furthermore, word embedding 308 may couple like words based on word context using the corresponding context and occurrence statistics. In some embodiments, numerical vector representations of words that capture semantic and contextual meaning of the words and word associations may be used such as GloVe and Word2Vex. At block 310 the output from word embedding 308 and first convolution pooling operation 306 is concatenated to combine the word and character embeddings.

In some embodiments, after the data is concatenated, the data may be received by first convolution pooling layer 312. Each of the cascaded pooling layers may comprise a one-kernel convolution 314, parallel pooling branches 316, and concatenation operation 318. In some embodiments, the one-kernel convolution 314 comprises 1,024 channels. Each branch of the parallel pooling branches 316 may comprise user specified parameters. For example, a pooling size (P), a channel size (C), and a dropout operation (D), may be defined for each pooling layer. Though each cascaded pooling branch is depicted as having the same parameters across first convolution pooling layer 312 and second convolution pooling layer 320, in some embodiments, the parameters may be different.

As depicted, the pooling size (P) may be three. The pooling size corresponds to the window 104 selection of the subset of elements from FIGS. 1A and 1B described above. Therefore, the elements immediately before and after the selected element may be analyzed together for the maximum value. For each of the parallel branches from left to right as depicted, the pooling size increases. A larger pooling size provides a larger number of elements to be processed for a maximum value providing element coupling across a larger sample. In some embodiments, any number of channels may be used. As depicted the number of channels decreases from left to right across the parallel pooling branches 316 as the pooling window increases.

The last parameter of parallel pooling branches 316, as depicted, is the dropout operation. The dropout operation as shown comprises decreasing values over each parallel pooling branch. The dropout values may be user assigned and randomly cancel neurons during training. This forces the NLP system to not focus on a single best match and to find alternative routes for training. The NLP system may become more robust during training of the convolution processes by including the dropout values and thus excluding some inputs. In some embodiments, the dropout rate or dropout keep rate selected by the user to obtain a robust NLP system is approximately ten percent. The dropout may be set to zero during inference.

Each branch may have a different number of outputs based on the convolution and maximum pooling operations. The output of each branch of the parallel pooling branches 316 may be processed through concatenation operation 318 to retain consistent dimensionality. Furthermore, in the max pooling operation a subset of input elements is compared to an input element. The input element that has the maximum score is coupled for each pooling window as described above. The process continues for each element coupling like elements. As such, exemplary operations are linear and do not require complex quadratic computations. After the data is processed through the cascaded convolution pooling layers, the data moves on to the next convolution layer 322 with a softmax activation function for normalizing the neural network output and predicting the probability distribution for classification of the elements of data from the output data.

Figure 4A:
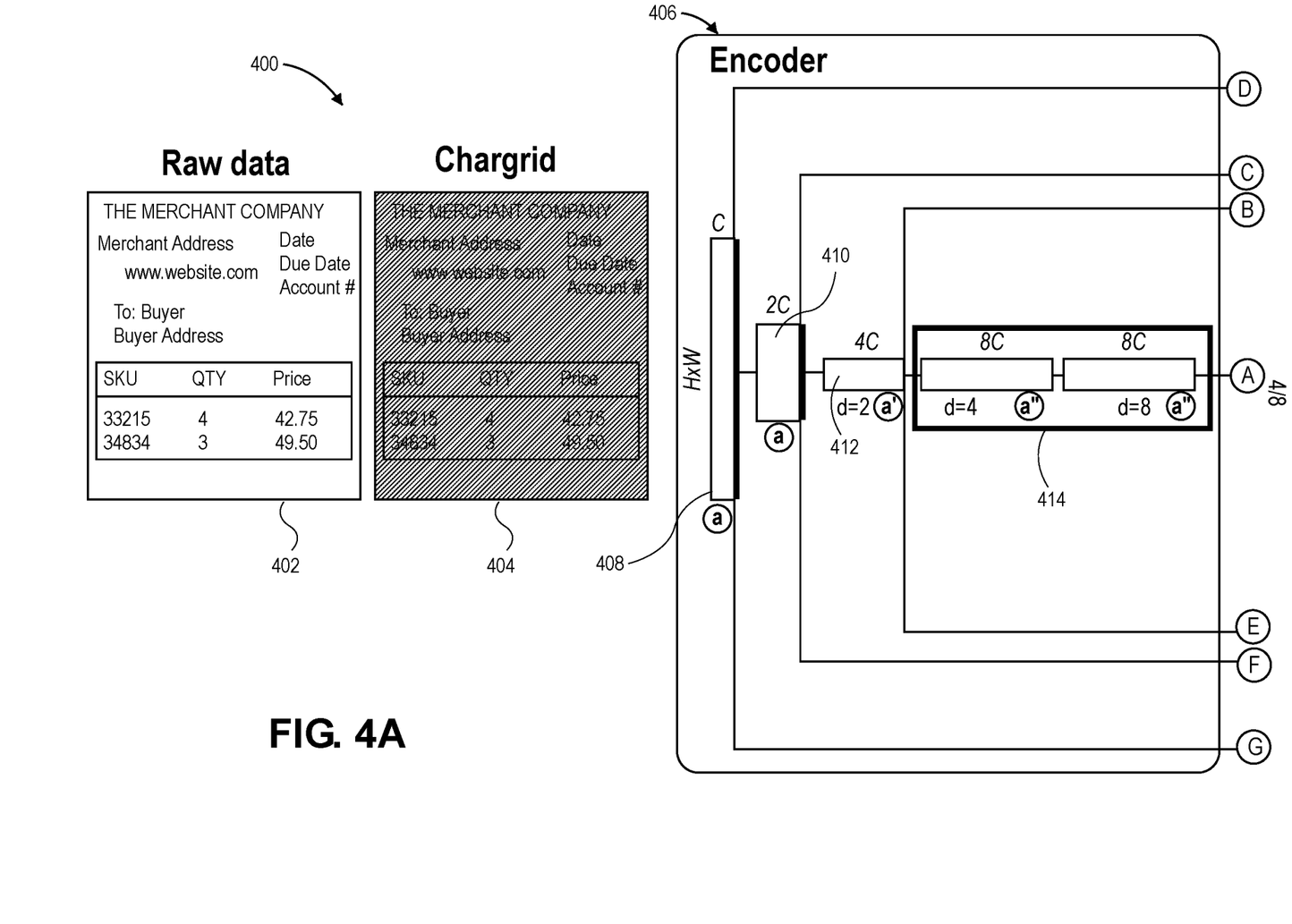
FIG. 4A-4B depicts exemplary neural networks for natural language processing.
Figure 4B:
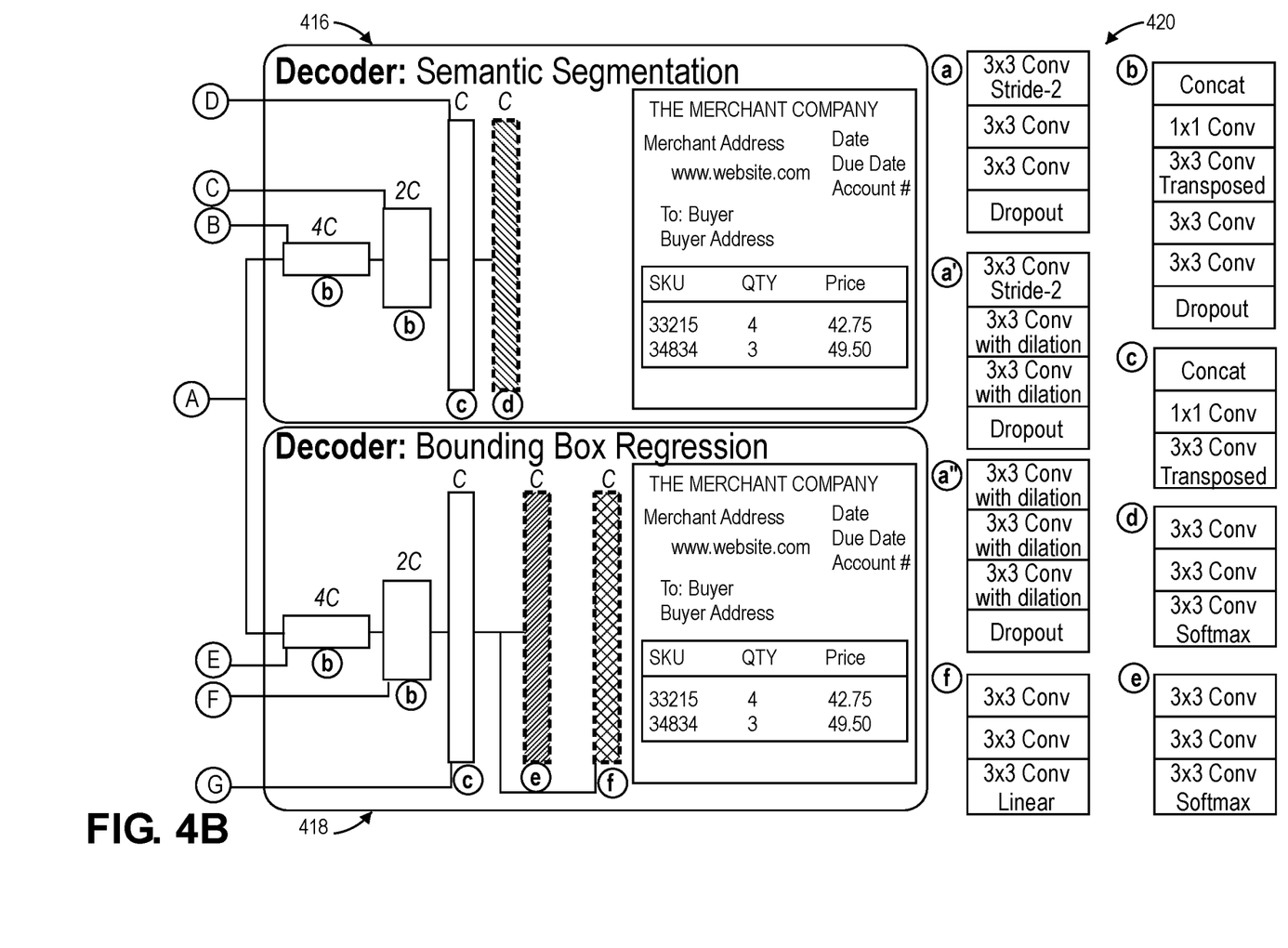

FIG. 4A and FIG. 4B depict a schematic of exemplary NLP network 400 receiving raw data and processing the raw data for natural language semantic recognition and characterization. As described above, the raw data may be received from any hard copy (e.g., paper copy) or digital document. If the document is a hard copy, OCR may be performed to extract digital information and presented as digital document 402. Otherwise, the original digital document may be received. Once digital document 402 is generated, a character grid 404 may be generated by analyzing digital document 402. The OCR image may be analyzed by a character grid operation before being passed to the convolution and pooling layers at the encoder 406. Rather than serializing and laying out the information from the OCR in a string, as in typical methods, character grid 404 may be generated. The character grid 404 is an exemplary representation for visualization and, in practice, may be a series of textual components, or a grid of text, with markers to retain the layout of the document. As such, the format of the document is retained. In some embodiments, character grid information may comprise special meaning as well as character and word meaning. For example, an invoice may comprise tables of values with headers. Simply recognizing the text and providing a continuous string may lose the location context of the document and thus the relationship between the headers and the subsequent text below the headers. Generating character grid 404 retains the location association between characters in the exemplary invoice. As such, semantic meaning between separate rows and columns may be retained for recognition and characterization later in the processing of the document data.

In some embodiments, character grid 404 may be generated by mapping each character to an index value. Digital document 402 information may be downsampled without loss of character information because the characters are represented by index values. Furthermore, the location association, or special relationship, is maintained. Furthermore, bounding boxes may be established by the character grid operation. For example, the invoice may have a header and information supplied directly below the header. A bounding box, or a marker, may be generated that contains, and couples, all of the pixels within the bounding box such that a relationship between the pixel locations, and characters, in the table is maintained. The bounding boxes and markers may be further evaluated for classification in the bounding box regression decoder for semantic analysis and classification described in detail below.

In some embodiments, the encoder and decoder may be generally referenced as a neural network. In some embodiments, NLP network 400 may be trained to classify information received from the character grid. In other embodiments, NLP network 400 may be trained to receive raw data. Either way, the NLP network 400 may recognize the text of the document by assigning values to pixels and correlating nearby pixels, or associated data, as well as far away pixels, or associated data, using the cascaded convolution pooling operations described above. In some embodiments, NLP network 400 may comprise a plurality of neural networks. As described below NLP network 400 comprises at least two neural networks (i.e., a semantic processing neural network and a bounding box regression neural network).

In some embodiments, the character grid or any other two-dimensional representation of the document may be received at encoder 406. The two-dimensional document representation is exemplary, and any document may be mapped to different dimensions that may be received and processed by encoder 406. Generally, NLP network 400 learns to characterize each input pixel from the character grid. Each input pixel, using the exemplary invoice described above, may be characterized as a date, a monetary value, a description, a name, and may be associated with a location on the invoice.

In some embodiments, encoder 406 comprises a series of cascaded convolution pooling layers as described above. In some embodiments, encoder 406 may comprise first cascaded pooling layer 408, second cascaded pooling layer 410, third cascaded pooling layer 412, and fourth cascaded pooling layer 414. Each cascaded pooling layer may comprise at least one convolution layer and at least one pooling layer as described above. Any number of convolution layers and max pooling layers may be used because the cascaded pooling layers do not downsample. Each convolution layer and max pooling layer operates as described in embodiments above. The output of each cascaded pooling layer is sent to the decoder to semantic segmentation decoder 416 and the bounding box regression decoder 418. As such, each cascaded layer provides character, word, and phrase recognition with retained document location and semantic meaning that is capable of being further classified for sematic language recognition.

In some embodiments, the decoder comprises semantic segmentation decoder 416 and bounding box regression decoder 418. A first neural network may comprise encoder 406 and utilize semantic segmentation to classify each character and, in some embodiments, words and phrases. A second neural network may comprise encoder 406 and utilize bounding box regression and may be trained to recognize several lines of input data from the character grid such that tables of data may be classified, or associated, together to retain and recognize semantic meaning from the document data. Semantic segmentation decoder 416 and bounding box regression decoder 418 may process the recognized characters and words from the cascaded convolution pooling layers to classify and further associate the document data.

In some embodiments, the semantic segmentation neural network is trained to identify semantic classes. The semantic classes may be word or phrase based when the words are coupled. In some embodiments, the semantic classification of words and phrases within the document may classify the document. Continuing with the exemplary invoice embodiment described above, a word "invoice" may be recognized. Furthermore, the layout of the invoice (e.g., tables and prices) may indicate that the document is an invoice, and the document classified as such. The semantic meaning of the words and phrases may be classified such as, for example, "payment," "website," "address." Furthermore, abbreviation like "QTY" may be recognized and classified as a "quantity." Further still, the SKU number 33215 may be associated with the quantity 4 such that this information has a known associated and is stored as such. The semantic classification may be aided by associating the locations of the elements by bounding box regression decoder 418 described below.

In some embodiments, the bounding box regression neural network may be trained to detect multiple rows of the document data thus correlating data that is not directly local in the document data. By correlating data that may be separated by rows, a bounding box may be added to the correlated data such that the data within the bounding box is coupled or given a semantic association. Returning to the invoice example described above, processing data through the bounding box regression neural network may provide coupling between headers of tables and the associated values that may be listed below the headers. As such, meaning is retained in the values in the table. The values and the table headers are not stand-alone data but are associated through location retention and bounding box classification. The output dimensions and the matrices of the outputs of each convolution pooling layer and the decoder layers is provided at section 420. These dimensions are specific to the input text and the processing dimensions and may be any values depending on the processing of the document data.

Therefore, NLP network 400 may receive the input from the character grid recognize the characters, words, and relationships thereof relative to the document layout. Furthermore, NLP network 400 may provide bounding boxes for layout relationship and provide semantic classification to the document, words, and phrases of the document. NLP network 400 comprising the semantic segmentation neural network and the bounding box regression neural network is not limiting, and NLP network 400 may comprise any number of layers and additional neural networks.

Figure 5:
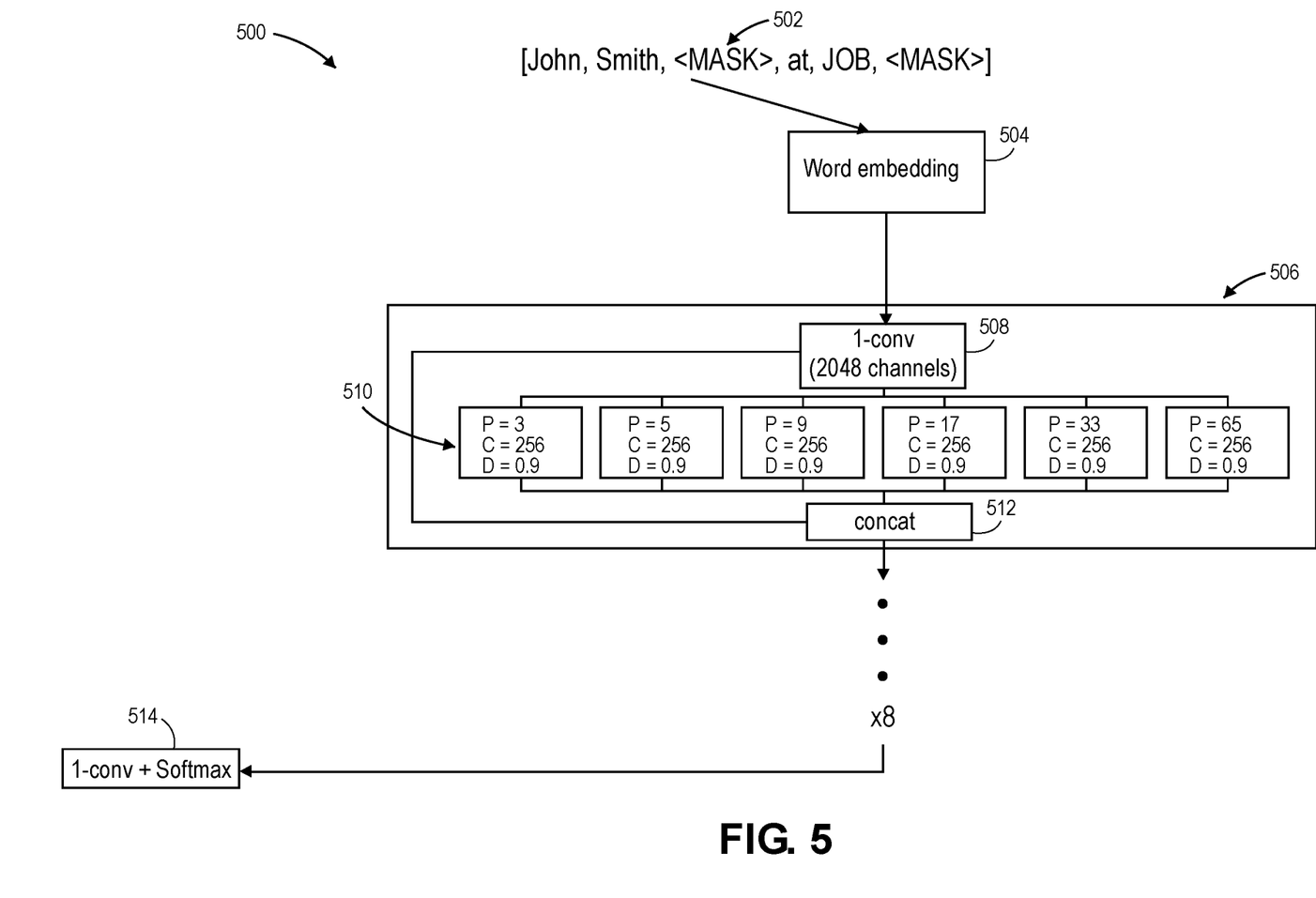
FIG. 5 depicts an exemplary cascaded convolution and pooling layer training sequence.

FIG. 5 depicts an embodiment of a convolution pooling layer 500 where the input sequence of words 502 is partially and randomly masked for input into the word embedding operation 504. The network architecture depicted in FIG. 5 may be a bi-directional language model based on denoising autoencoders. An objective may be to predict the words that have been masked. Each input token is mapped to a randomly initialized word embedding vector at word embedding operation 504. In some embodiments, the resulting sequence of word embedding vectors is passed to first cascaded pooling layer 506 then through seven subsequent cascaded pooling layers.

As depicted in FIG. 5, first cascaded pooling layer 506 comprises convolution layer 508 and parallel pooling branches 510 comprising window size P—3, 5, 9, 17, 33, and 65; channel size C—constant across all parallel pooling branches at 256; and dropout keep rate D—also constant across all parallel pooling branches at 0.9. The parallel pooling branches are concatenated at block 512 and the output is sent to convolution and activation block 514. This process results in a translational invariant process that is faster than current methods because the input is linear in the number of input elements, the branches are parallelizable, and there is no strict ordering of input elements. Here eight cascaded layers are used; however, any number of cascaded layers may be used in the network. Training the network using this process provides a more robust network. The network described here may be added at any of the blocks depicted in FIG. 4A where cascaded max pooling layers are used.

Figure 6:
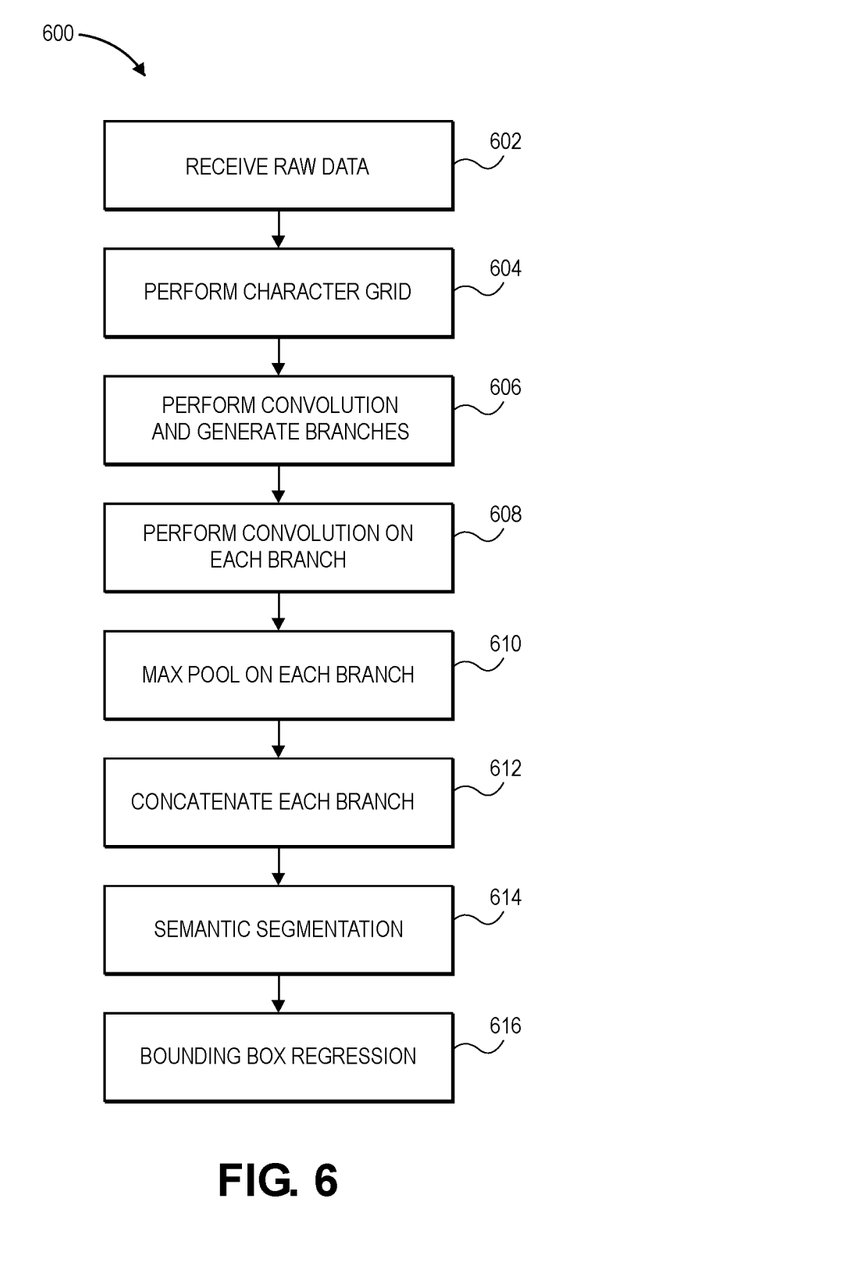
FIG. 6 depicts an exemplary method of natural language processing of a document.

FIG. 6 depicts an exemplary method of natural language processing using cascaded max pooling layers generally referenced by the numeral 600. At step 602, the document may be received in digital form or a hard copy and digitized using OCR. The document may be scanned by an OCR scanner to detect characters, locations of characters, bounding boxes, and any other information provided on the documents. In some embodiments, the document data may be stored as data strings and metadata may be stored for relating the location and the format of the document. Any information stored by the OCR process may be utilized by the subsequent character grid and the NLP network as described in embodiments herein.

At step 604, the document information from step 602 is received and a character grid may be generated. After OCR, a character grid may be applied to the document data to associate character and word locations such that words and characters may be correlated. In some embodiments, the character grid may be a string of data indicative of the characters, words, lines, and any information that is provided on the document. The character grid may store information relating the characters by location on the documents such that the document layout is not lost prior to processing by the NLP network. The character location information may be retained providing valuable semantic information that may be classified by the NLP network.

At step 606, an initial convolution and maximum pooling operation may be performed. In some embodiments, the convolution neural network (CNN) may be trained to classify information received from the character grid. In other embodiments, the CNN may be trained to receive raw data. Either way, the CNN may recognize the text of the document by assigning values to pixels, or associated data, and correlating nearby pixels, or associated data, as well as far away pixels, or associated data, using the cascaded max pooling operations described above. An initial convolution max pooling operation may be performed to recognize the characters and words in the received data. Furthermore, the data may be correlated and separated into branches for further processing.

At step 608, a convolution layer is performed on each branch as described in detail above. The convolution layer may be trained to process individual pixels, or associated document data, and assign values to each pixel, or associated document data, based on a convolution filter analysis applied to regions of the document or document information received from the prior steps. This convolution process may be conducted any number of times through any number of layers.

At step 610, a max pooling layer is applied to the output of the convolution layer to correlate maximum values of the pixels and associated data from the convolution layer. In some embodiments, the max pooling layers comprise window 104 for processing a user defined number of values from the convolution layer. The maximum number from window 104 is mapped to the output data for the next step. It should be noted that the data is not downsampled during the max pooling process. As such, the dimensionality of the output remains the same as the input from the max pooling process and what remains are the maximum values for each window that is processed. The max pooling process may be performed over the data for several window sizes, channel sizes, and a dropout rate may be applied for robust training. There may be any number of cascaded convolution max pooling layers. Furthermore, at step 612, each branch is concatenated to combine for consistent output dimensionality.

At step 614, semantic segmentation is performed to generate semantic meaning for words and phrases within the document data. The semantic segmentation neural network may be trained to identify semantic classes. The semantic classes may be word or phrase based when the words are coupled. In some embodiments, the semantic classification of words and phrases within the document may classify the document. Continuing with the exemplary invoice embodiment described above, a word "invoice" may be recognized. Furthermore, the layout of the invoice (e.g., tables and prices) may indicate that the document is an invoice, and the document classified as such. The semantic classification of words and phrases may be performed as described in embodiments above.

At step 616, bounding boxes may be generated comprising same semantic meaning for the elements within the bounding box by the bounding box neural network described above. The bounding box regression neural network may be trained to detect multiple rows of the document data thus correlating data that is not directly local in the document but has the same or similar semantic meaning. By correlating data that may be separated by rows and columns a bounding box may be added to the correlated data such that the data within the bounding box is coupled by some semantic meaning. Returning the invoice example described above, processing data through the bounding box regression neural network may provide coupling between headers of tables and the associated values that may be listed below the headers. As such, meaning is provided to the values in the table and the data processed from the document is not simply stand-alone data but retains semantic meaning for classification.

Figure 7:
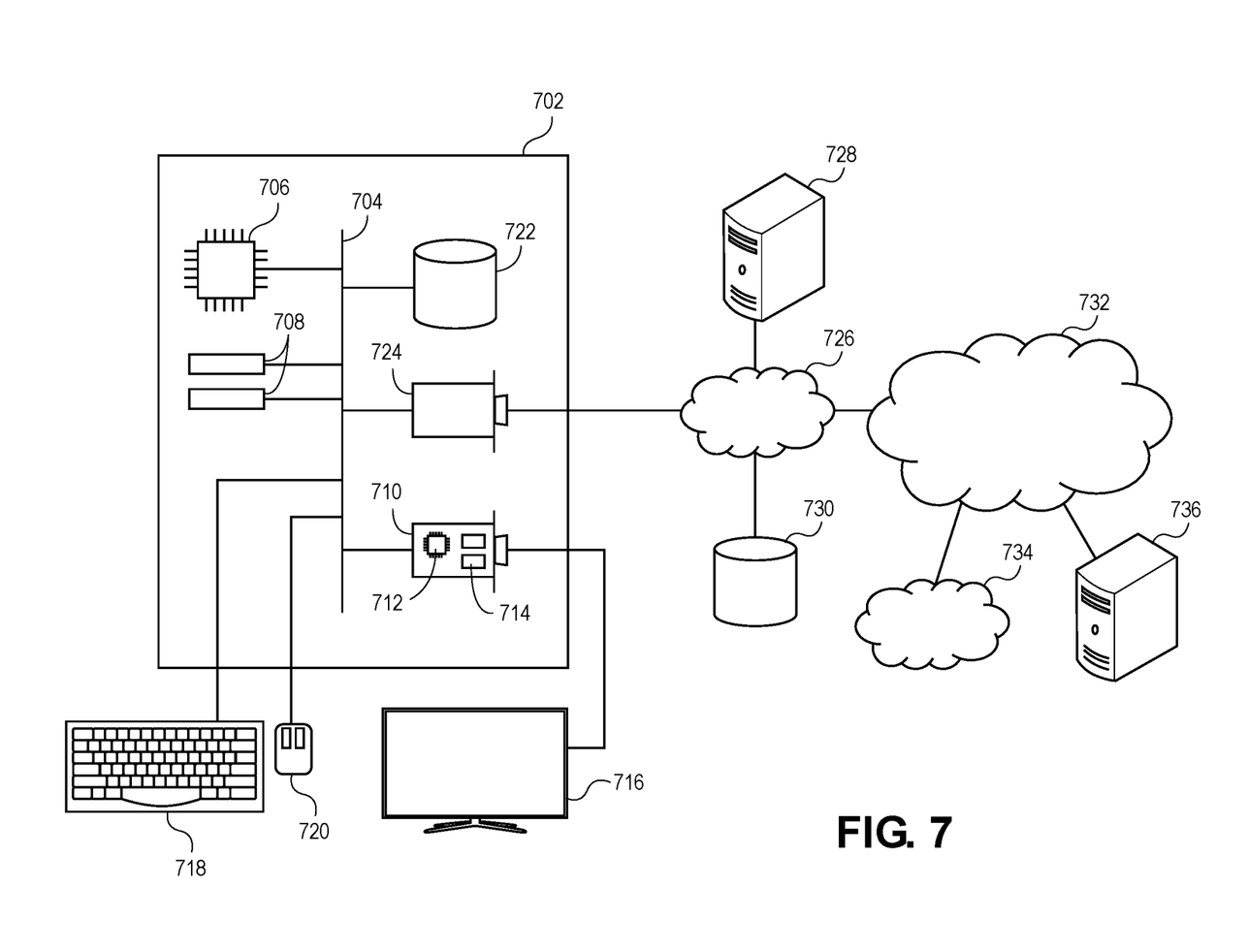
FIG. 7 depicts an exemplary hardware platform for embodiments.

Turning first to FIG. 7, an exemplary hardware platform that can form one element of certain embodiments of the invention is depicted. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media and may be internally installed in computer 702 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732.

Although embodiments of the invention have been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A computerized method comprising:
processing, by one or more processors, text of a digital document to generate input elements for input into one or more neural networks while retaining document location information indicative of locations of elements in the digital document; and processing the text by one or more neural networks by performing operations comprising:
  performing a convolution operation on the input elements to generate a first number of output channels;
  generating a plurality of parallel pooling branches receiving the first number of output channels from the convolution operation, each parallel pooling branch having an independently user-defined pooling window, an independently user-defined dropout rate, and an independently user-defined number of output channels;
  performing at least one maximum pooling operation on each pooling branch to generate an output of a plurality of maximum valued elements for the pooling window analyzed across all of the output channels for the pooling branch;
  concatenating the plurality of maximum valued elements from each of the plurality of parallel pooling branches to produce a convolution pooling output; and
  generating semantic classifications for the text based on the document location information and the convolution pooling output;
wherein the dropout rate is applied during training to improve robustness.

2. The computerized method of claim 1, further comprising:
  generating a character grid from the digital document, wherein each character of the text is associated with a location on the digital document such that a format of the digital document is maintained; and
  generating a reduced character grid by downsampling the character grid to reduce unnecessary data for processing.

3. The computerized method of claim 1, further comprising performing optical character recognition on a paper document to create the digital document.

4. The computerized method of claim 1, wherein the performing at least one maximum pooling operation on each pooling branch to generate an output of a plurality of maximum valued elements for the pooling window analyzed across all of the output channels for the pooling branch generates an output with a same size and dimension as an output of the convolution operation for the pooling branch.

5. The computerized method of claim 1, wherein:
  each input element is a vector; and
  each pooling layer comprises a 1,024-channel one-kernel convolution at a layer input and comprises at least six pooling branches.

6. The computerized method of claim 1, wherein:
  each pooling branch operates on 256 channels and each pooling window comprises element sizes of 3, 5, 9, 17, and 33; and
  each pooling branch comprises a dropout keep probability of 0.9 for adding robustness in training.

7. The computerized method of claim 1, further comprising:
  processing the text through a word-level encoding process to generate word vectors of word couplings while retaining the document location information; and
  generating bounding boxes indicative of various semantic classes based on the document location information and the convolution pooling output.

8. One or more non-transitory computer-readable media storing computer-executable instruction that, when executed by a processor, perform operations comprising:
  processing text of a digital document to generate input elements for input into one or more neural networks while retaining document location information indicative of locations of elements in the digital document; and
  processing the text by one or more neural networks by performing operations comprising:
    performing a convolution operation on the input elements to generate a first number of output channels;
    generating a plurality of parallel pooling branches receiving the first number of output channels from the convolution operation, each parallel pooling branch having an independently user-defined pooling window, an independently user-defined dropout rate, and an independently user-defined number of output channels;
    performing at least one maximum pooling operation on each pooling branch to generate an output of a plurality of maximum valued elements for the pooling window analyzed across all of the output channels for the pooling branch;
    concatenating the plurality of maximum valued elements from each of the plurality of parallel pooling branches to produce a convolution pooling output; and
    generating semantic classifications for the text based on the document location information and the convolution pooling output;
  wherein the dropout rate is applied during training to improve robustness.

9. The non-transitory computer-readable media of claim 8, wherein the operations further comprise:
  generating a character grid from the digital document, wherein each character of the text is associated with a location on the digital document such that a format of the digital document is maintained; and
  generating a reduced character grid by downsampling the character grid to reduce unnecessary data for processing.

10. The non-transitory computer-readable media of claim 8, wherein the operations further comprise performing optical character recognition on a paper document to create the digital document.

11. The non-transitory computer-readable media of claim 8, wherein the performing at least one maximum pooling operation on each pooling branch to generate an output of a plurality of maximum valued elements for the pooling window analyzed across all of the input elements generates an output that is a same size and dimension as the input elements.

12. The non-transitory computer-readable media of claim 8, wherein:
  each input element is a vector; and
  each pooling layer comprises a 1,024-channel one-kernel convolution at a layer input and comprises at least six pooling branches.

13. The non-transitory computer-readable media of claim 8, wherein:
  each pooling branch operates on 256 channels and each pooling window comprises element sizes of 3, 5, 9, 17, and 33; and
  each pooling branch comprises a dropout keep probability of 0.9 for adding robustness in training.

14. The non-transitory computer-readable media of claim 8, wherein the operations further comprise:

processing the text through a word-level encoding process to generate word vectors of word couplings while retaining the document location information; and generating bounding boxes indicative of various semantic classes based on the document location information and the convolution pooling output.

15. A system comprising:

one or more processors;

a data store; and one or more non-transitory computer-readable media storing computer-executable instruction that, when executed by the processor, perform a method comprising:

processing text of a digital document to generate input elements for input into one or more neural networks while retaining document location information indicative of locations of elements in the digital document; and processing the text by one or more neural networks by performing operations comprising:

performing a convolution operation on the input elements to generate a first number of output channels;

generating a plurality of parallel pooling branches receiving the first number of output channels from the convolution operation, each parallel pooling branch having an independently user-defined pooling window, an independently user-defined dropout rate, and an independently user-defined number of output channels;

performing at least one maximum pooling operation on each pooling branch to generate an output of a plurality of maximum valued elements for the pooling window analyzed across all of the output channels for the pooling branch;

concatenating the plurality of maximum valued elements from each of the plurality of parallel pooling branches to produce a convolution pooling output; and generating semantic classifications for the text based on the document location information and the convolution pooling output;

wherein the dropout rate is applied during training to improve robustness.

16. The system of claim 15, wherein the performing at least one maximum pooling operation on each pooling branch to generate an output of a plurality of maximum valued elements for the pooling window analyzed across all of the input elements generates an output size that is a same size and dimension as the input elements.

17. The system of claim 15, wherein:

each pooling branch operates on 256 channels and each pooling window comprises element sizes of 3, 5, 9, 17, and 33; and each pooling branch comprises a dropout keep probability of 0.9 for adding robustness in training.

18. The system of claim 15, wherein the operations further comprise:

generating a character grid from the digital document, wherein each character of the text is associated with a location on the digital document such that a format of the digital document is maintained; and generating a reduced character grid by downsampling the character grid to reduce unnecessary data for processing.

19. The system of claim 15, wherein the operations further comprise performing optical character recognition on a paper document to create the digital document.

20. The system of claim 15, wherein:

each input element is a vector; and each pooling layer comprises a 1,024-channel one-kernel convolution at a layer input and comprises at least six pooling branches.

* * * * *